STORAGE PROTECTION SYSTEMS

Filed April 6, 1964 7 Sheets-Sheet 1

*INVENTORS*
GENE M. AMDAHL
RICHARD J. CARNEVALE
ARTHUR F. COLLINS
ELLIOTT R. MARSH
ANTHONY E. VILLANTE
*BY* John C Black
*ATTORNEY*

June 27, 1967 G. M. AMDAHL ET AL 3,328,768

STORAGE PROTECTION SYSTEMS

Filed April 6, 1964 7 Sheets-Sheet 2

3,328,768

STORAGE PROTECTION SYSTEMS

Gene M. Amdahl, Poughkeepsie, Richard J. Carnevale, Endwell, Arthur F. Collins, Vestal, Elliott R. Marsh, Endicott, and Anthony E. Villante, Binghamton, N.Y., assignors to International Business Machines Corporation, New York, N.Y., a corporation of New York Filed Apr. 6, 1964, Ser. No. 357,387
9 Claims. (Cl. 340—172.5)

Figure 1A:
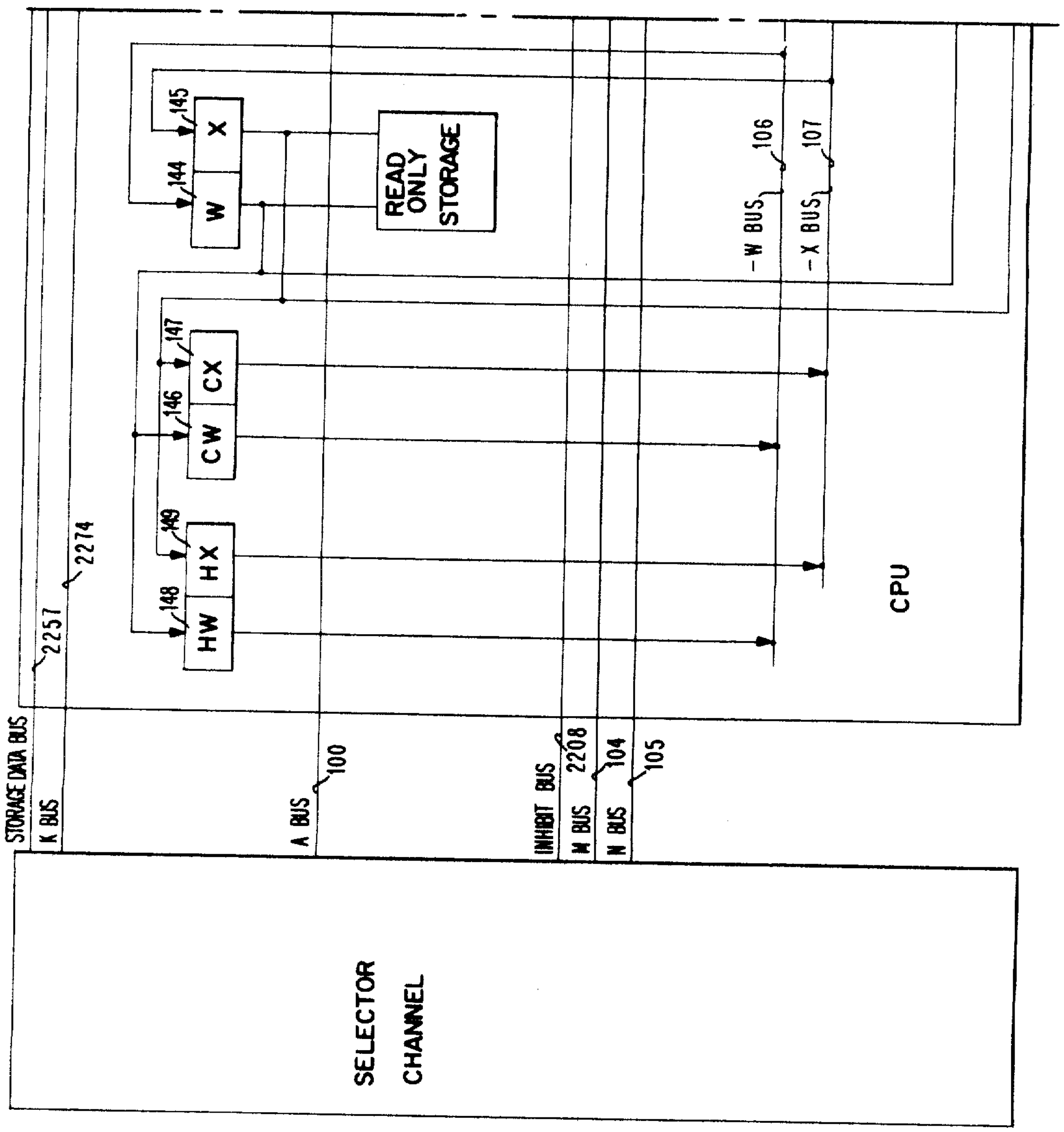

This invention relates generally to data processing apparatus and more particularly to improved means for preventing the invalid alteration of data in a main storage area of the apparatus due to a program error or the like.

The preferred form of the improved storage protection means has been particularly designed for operation in the data processing apparatus set forth in an application of Gene M. Amdahl et al., Ser. No. 357,372, filed Apr. 6, 1964, and assigned to the assignee of the present application. The said application of Gene M. Amdahl et al., is specifically incorporated herein by reference as if it were set forth herein in its entirety.

It will be appreciated, however, that the improved storage protection means may be incorporated in data processing apparatus of other types in accordance with the teachings of the present application without the exercise of inventive skill and that the present invention is to be limited only by the scope of the appended claims.

In the data processing art, it has long been known that the main storage apparatus of a data processing system may be so large so as to require subdivision into various areas. Each area may relate to a different particular function of the system or may be assigned to a particular program, more than one of which may be loaded into the storage apparatus at any one given time. In order to afford a measure of protection for certain of these areas, e.g. preventing them from being erroneously used for unrelated functions or programs, various forms of storage protection have been developed. In some of these forms, the starting and finishing address of a protected area may be identified, and each accessed address in compared with these addresses in order to determine whether or not it falls within a protected area. If the address falls within a particular area, then access would not be permitted.

A more refined system includes dividing a storage system into discreet areas, the areas being relatively defined and fixed, and utilizing an individual signal on a particular connector or conductor in order to identify a permissive condition for accessing that particular area.

Additional improvements have included provision of coded identification of the various divisions or areas of the storage apparatus together with coded manifestations which permit access only to a similarly coded area of the storage system whereby access to an area of said storage system is permitted only when a storage accessing instruction is accompanied by a correct similar combination from the central portion of the data processing system.

Thus, there is provided in the data processing art several methods or means for relegating various sections of a storage system to particular purposes, and protecting said sections from being accessed in furtherance of nonrelated purposes.

However, the improvements in data processing systems of the present day require additional sophistication over those of the past, and sophistication itself requires improvements in all forms of system control, including storage protection. For instance, storage protect means of the prior art permitted access to protected areas of storage only when accompanied by the correct code. It access was desired without regard to whether or not an area was protected, the code for that area must first be changed from a protective to some sort of an unprotected code, or, alternatively, the code currently being used by the central processing portion must be changed to equal the code of the protected area thereby to gain access to said area.

Furthermore, data processing systems have become more and more complex, and currently include several main areas which have distinct but related functions, all of which combine so as to achieve the overall performance characteristics including computations and logical formulations as well as mere handling of data, particularly, handling of data between the central portions of the machine and the input/output devices thereof. These various portions of a system frequently are made to be independently communicable with the central storage area of the system. It is therefore apparent that protection of certain areas of storage which are accessible only by the provision of proper coded indicia from the central portion of the data processing system hampers the use of storage by input/output device control means.

Therefore, it is the primary object of the present invention to provide a sophisticated storage protection system.

Other objects of the invention include:

Provision of a storage protection system in which the accessibility of various areas of storage by the CPU (central processing unit) is not limited to a single coded indicia control;

Provision of a storage protection system wherein the CPU may access various areas of storage without the necessity of specially altering the coded indications identifying the particular protected storage areas;

Provision of a storage protection system wherein the CPU need not provide storage protection control, need not create permissitivity of access to protected areas of storage for I/O (input-output) units of the system;

Provision of a storage protection system wherein various areas of main storage may be more flexibly assigned to various protection boundaries;

Provision of a storage protection system wherein I/O device control includes the ability for rapid access to protected areas of storage;

Provision of a storage protection system having a combination of related protection and access controls giving a greater flexibility to overall data processing system control.

In accordance with the present invention, the main storage of a data processing system is subdivided into a plurality of areas, each area having a respectively corresponding register within which a particular coded manifestation may be stored. A coded manifestation of zero (or other suitable selected code) may designate the fact that the particular area is considered unprotected, and may be accessed by a command accompanied with any of the permissible coded manifestations of the entire set. Further, by storing the same coded manifestation in the registers corresponding to a plurality of storage areas, said areas can be grouped together.

A PSW (program status word) is provided for each program loaded into main storage for CPU processing; and each PSW includes a coded manifestation or key which designates the main storage area which is available for running the program. In addition, a coded manifestation or key is provided for each I/O device. If either of these manifestations are set to 0000 (or said other suitable combination), then all areas of storage become unprotected during running of the CPU program or during the I/O operation.

The present invention permits the use of selectively protected or unprotected areas of storage, any storage area being readily changed from a protected designation to an unprotected designation, and areas being readily grouped together merely by utilizing the same designation for the areas in the group. Furthermore, in order to enhance the operation of I/O device control circuitry, the I/O control is provided with coded manifestations which can enable I/O devices to reach protected storage areas, selectively, as necessary, without changing the basic coded manifestation established for the central processing portion of the data processing system. Furthermore, either the I/O device control or the central processing portion of the system may be given the power to reach any protected or unprotected area of storage merely by providing a special coded designation.

This invention permits faster accessing of memory by I/O devices, permits more flexible programming of the entire data processing system, and gives the data processing system programmer a capable yet flexible tool for guaranteeing protection as necessary without requiring a plurality of housekeeping routines to be performed previous to altering the condition of various storage areas during housekeeping operations of the computer itself.

The foregoing and other objects, features and advantages of the invention will be apparent from the following more particular description of a preferred embodiment of the invention, as illustrated in the accompanying drawings.

Figure 1B:
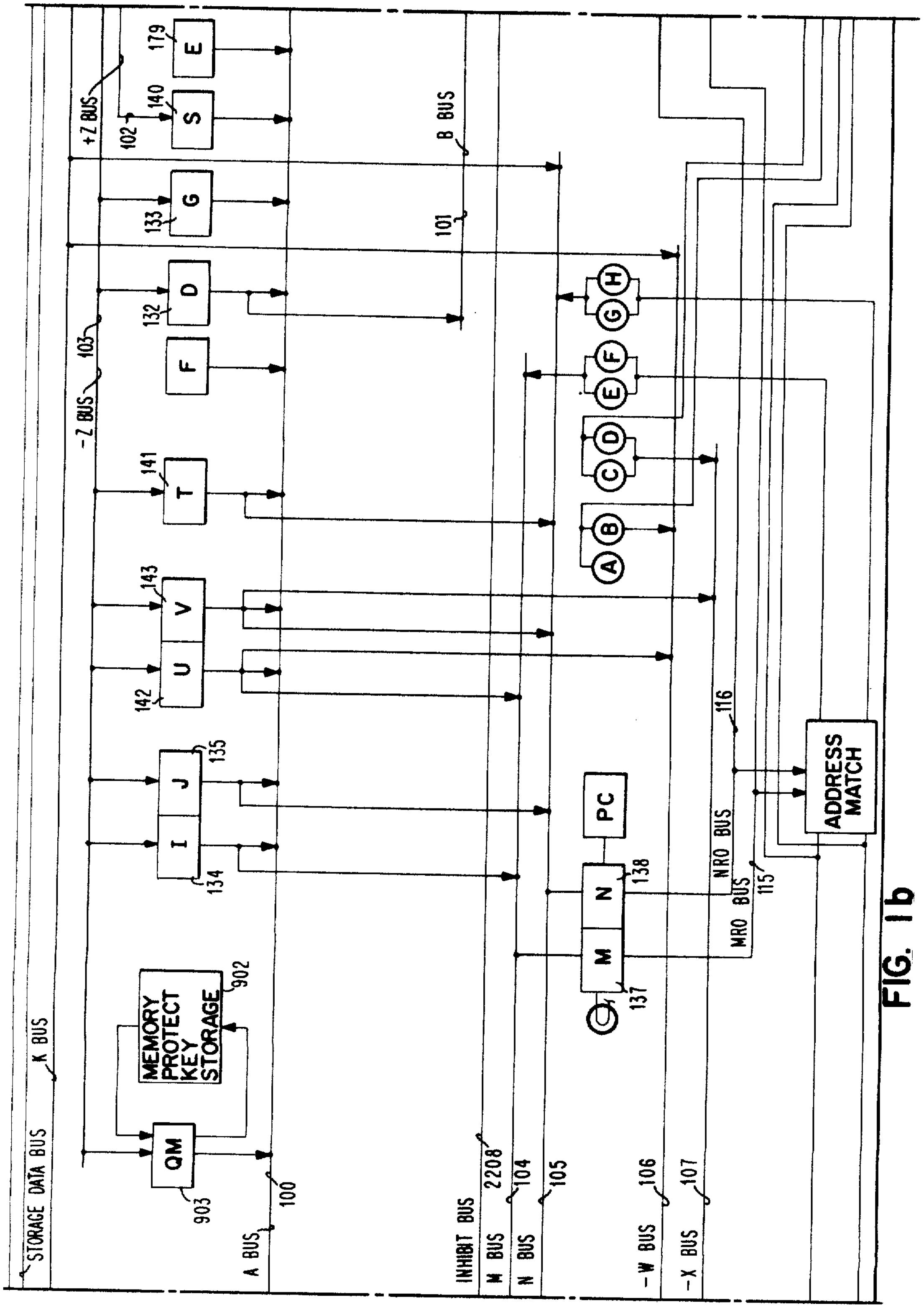
Figure 1C:
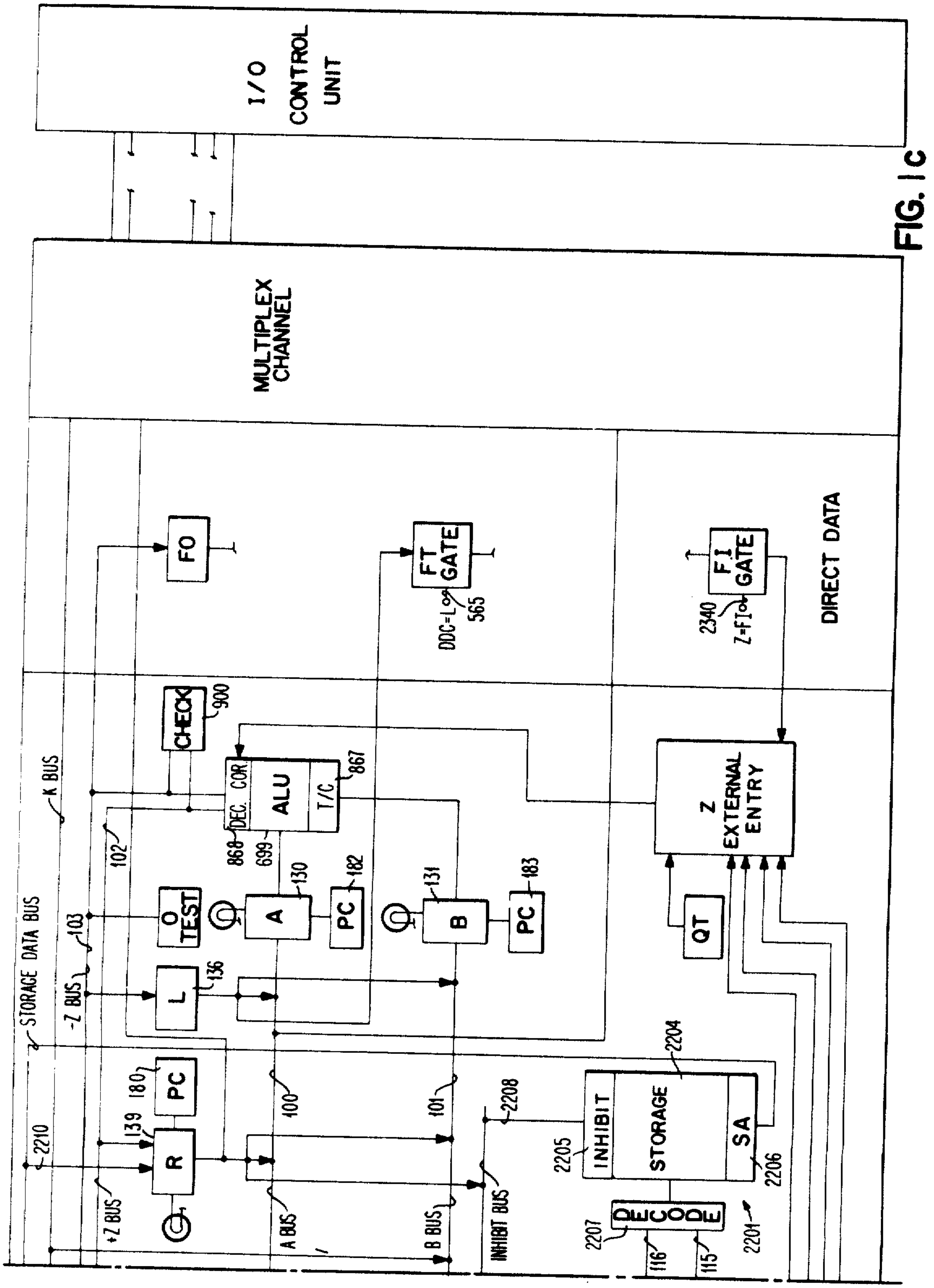

In the drawings:

FIGS. 1*a*, 1*b*, and 1*c* taken together form the data flow circuit of a central processing unit incorporating the present invention.

Figure 2:
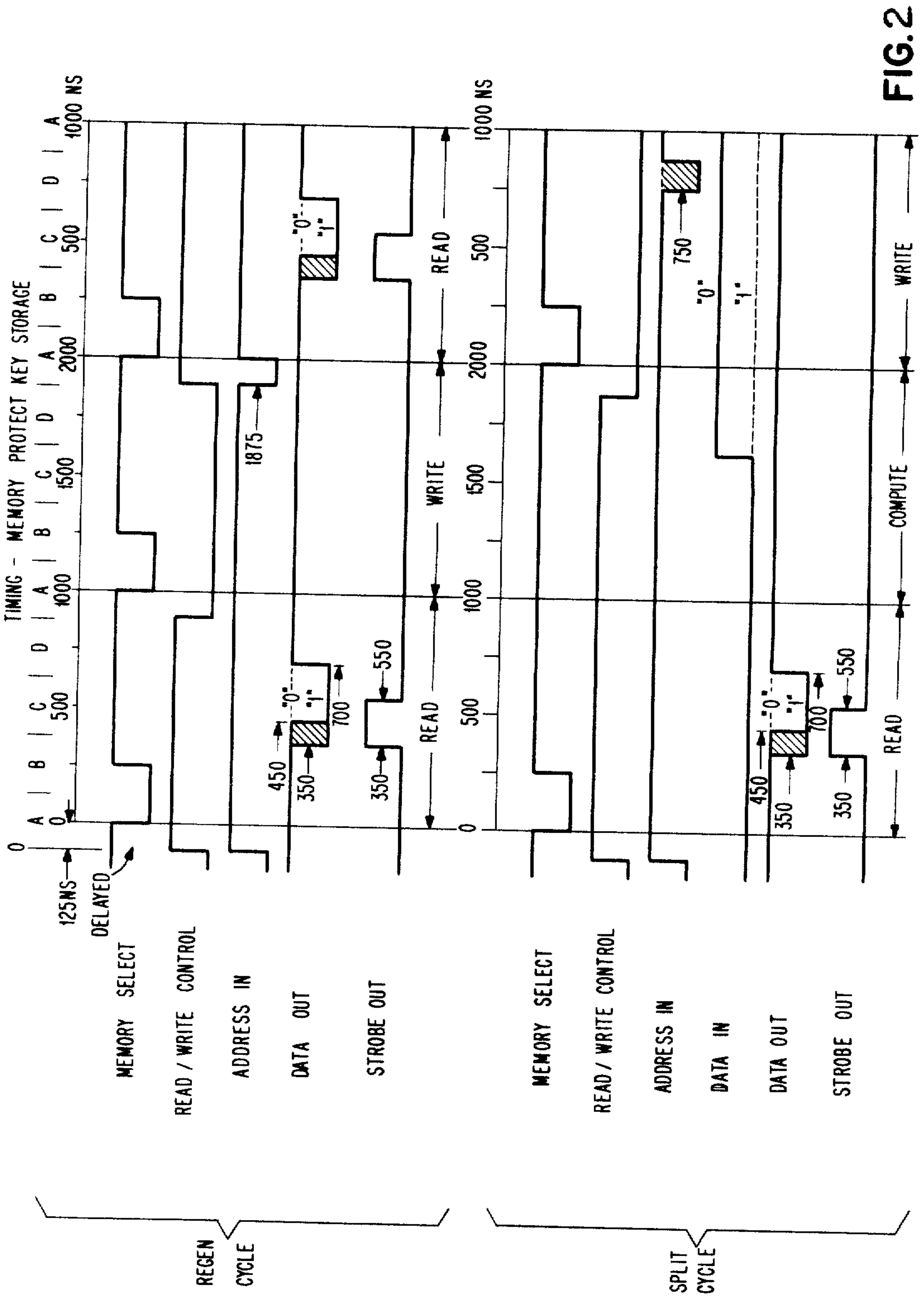

FIG. 2 is a timing chart illustrating the various control signals for the key storage device of the present invention.

Figure 3A:
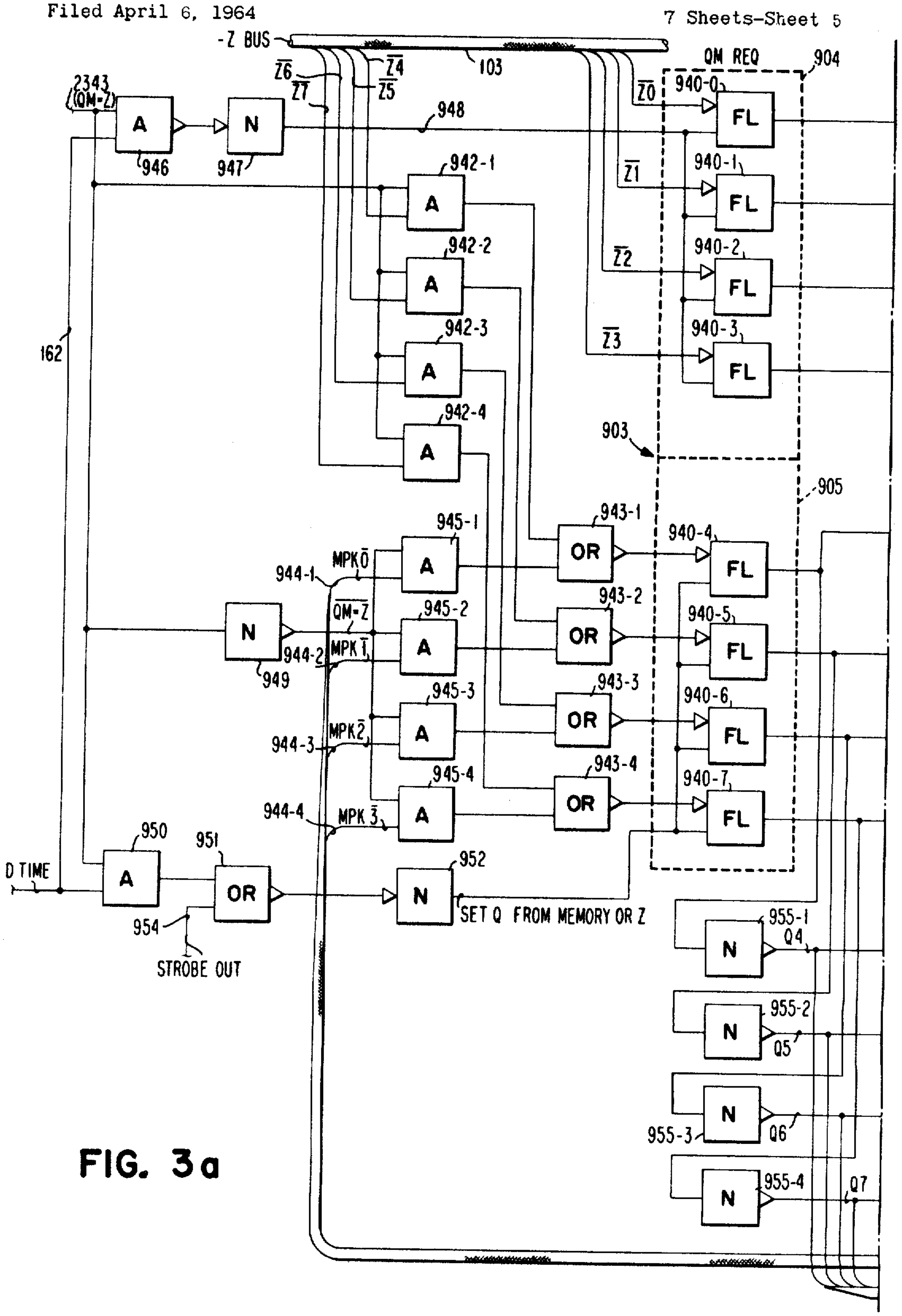
Figure 3B:
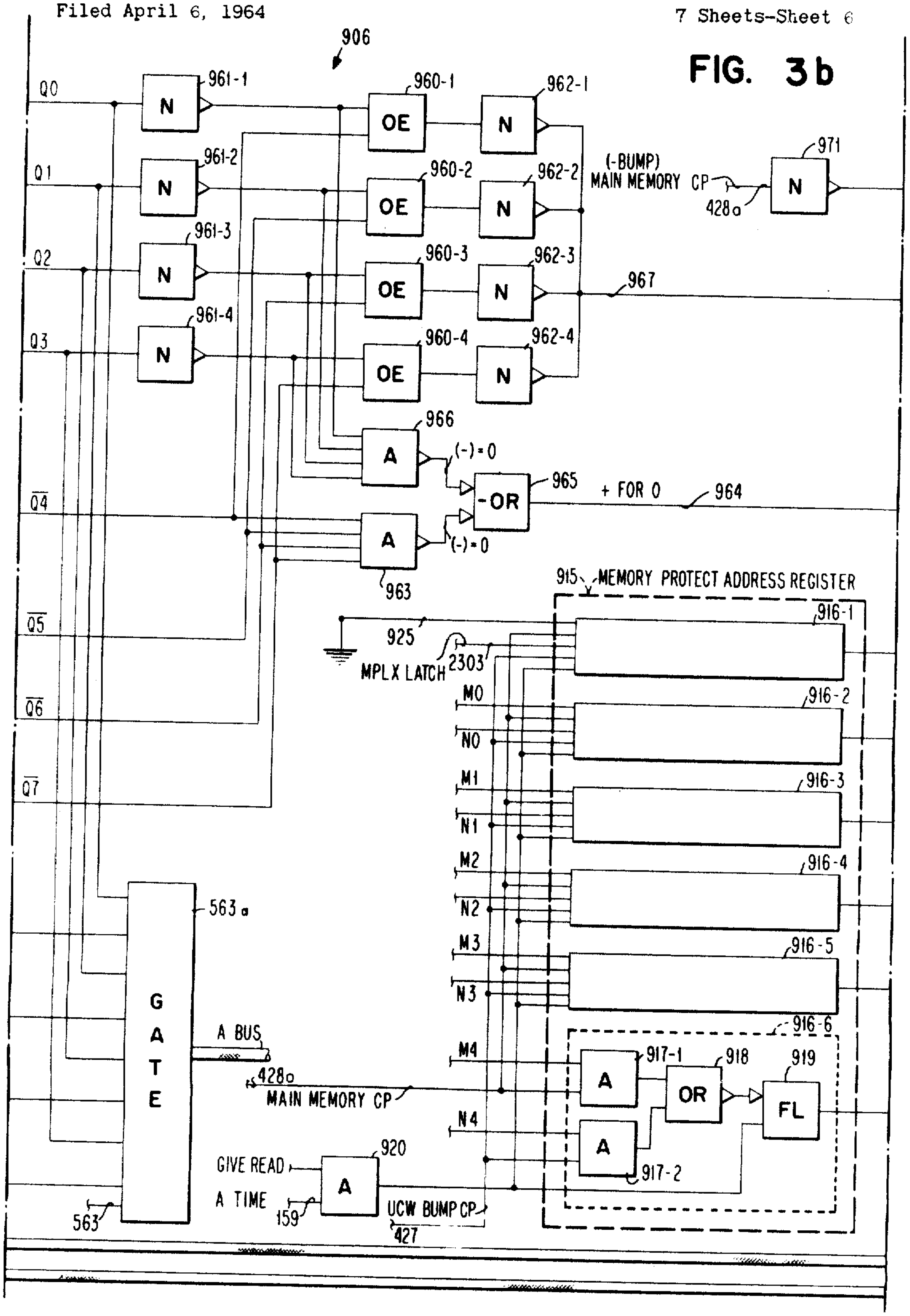
Figure 3C:
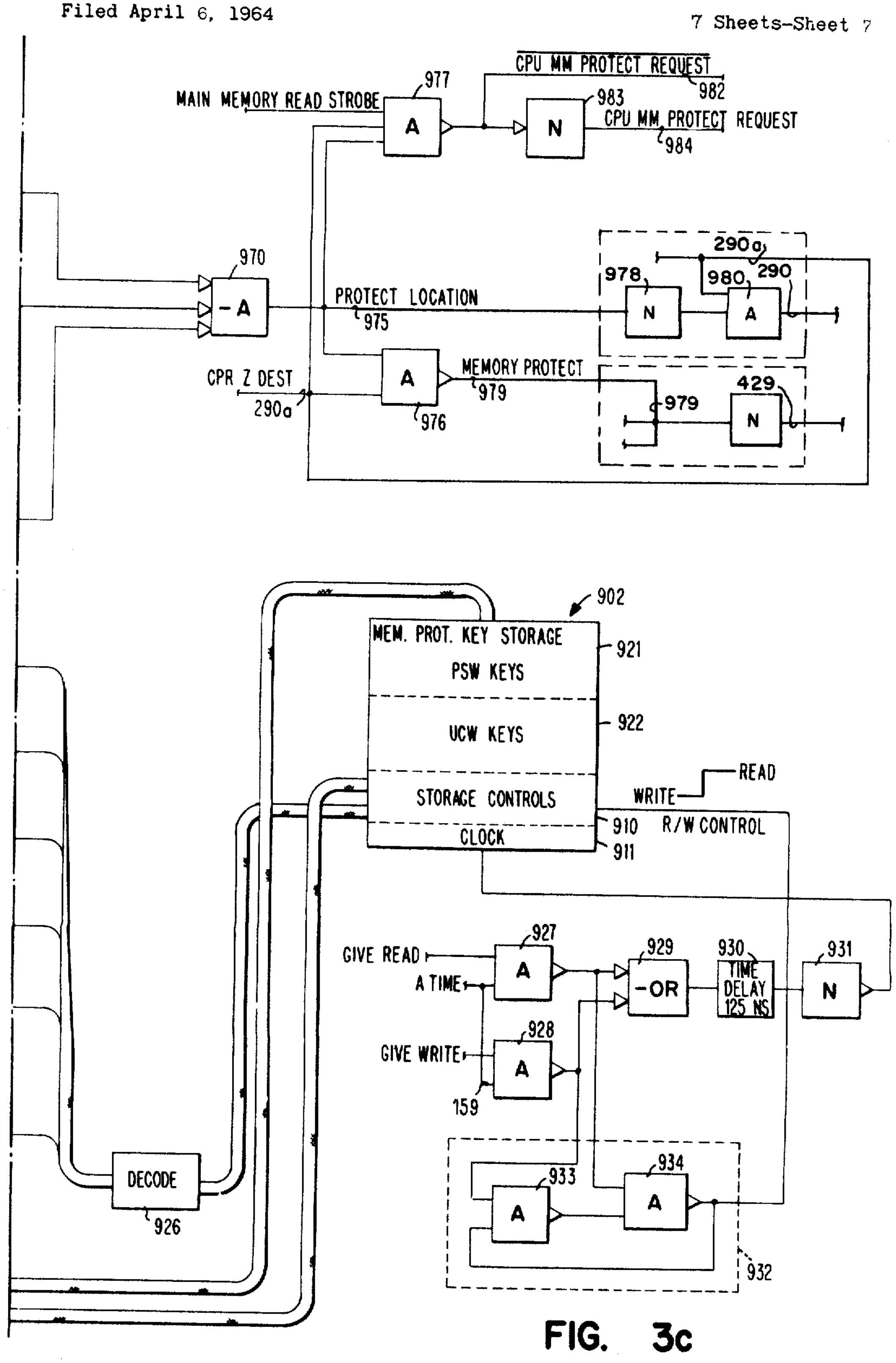

FIGS. 3*a*, 3*b* and 3*c* illustrate the improved storage protection circuits diagrammatically.

The preferred embodiment of the present invention has been specifically designated for use in the data processing system forming the subject matter of said Amdahl et al. application. In this patent application is contained a very complete description of all the circuits of the central processing unit used in the present invention. Further, this application contains an appendix of all micro instruction words and flow charts of all operations. For details of the data processing system circuitry, micro instruction word details and flow diagrams, applicants rely on the above application to supply the same.

The data processing machine, within which the present invention is used, is shown in FIGS. 1*a*, 1*b* and 1*c*. Storage device 2204 is utilized for the retention of data transferred to or from I/O devices, for general usage, for instructions, etc. Besides the storage device, per se, containing settable square hysteresis loop cores, sense amplifiers 2206 are provided for information read from said cores while inhibit drivers are provided for setting the cores to reflect data on bus 2208.

A decode 2207 selects the 8-bit byte within storage 2204 to be read out on data bus 2257.

An M register 137 and an N register 138 are the storage address registers which are utilized to select a byte location in storage from which information will be read or written. Each register 137 and 138 contains one byte or 8 bits. By setting a number into the MN register a particular location in core storage will be read therefrom.

An I register 134 and a J register 135, FIG. 1*b*, normally operate as the instruction counter for the data processing machine. This combination of registers where the I register is the high order and the J register is the low order normally contain the address of the next instruction word byte which is to be read from the storage 2204. However, depending on the function which is to be performed by the CPU the contents of the IJ register may be stored within the data storage device 2204 in a location designated as CPU bump and the IJ register used for the location of an operand address.

A U register 142 and a V register 143 each have a capacity of one byte. The U register contains the high order byte while the V register contains the low order byte. The UV register normally contains the address of the operand which is to be utilized in the data processing apparatus. A T register 141 is also an address register and is normally used for selecting particular areas in storage designated general purpose registers.

The T register which contains only one byte addresses the low orders in storage. The general purpose register is indicated by the high order bits in the T register while the bytes within a general purpose register are designated by the lowest two bits so that a general purpose register which has a total of four bytes or 32 bits may have each byte individually selected.

The IJ, UV, and T registers are connected to the MN bus 104, 105. In the ordinary sequence of operations the address contained in these registers is moved during one micro instruction word from a particular address register to the MN register and in the subsequent micro control instruction a location within storage is read out.

A D register 132, FIG. 1*b*, is a general purpose register and is generally used in various operations for holding a byte of data while the central processing unit manipulates other data in combination therewith to generate from logical conclusion from the resulting combination.

A G register 133 is the location where the operation code byte is stored. The S register 140 contains 8 latches labelled S0 through S7. These latches are used for indicating a particular condition or control function within the machine and generate signals, influence machine operations through selection of micro instructions.

In general each latch in the S register 140 serves a specific function as follows:

| | |
|---|---|
| **S0** | True/Complement latch. |
| **S1** | Executive code and data channel request latch. |
| **S2** | Answer not zero latch. |
| **S3** | Carry latch. |
| **S4** | Z high=zero. |
| **S5** | Z low=zero. |
| **S6** and **S7** | General purpose switches. |
| **S8** | Decode latch. |

The L register 136 is generally used to store the length of the field to be read from storage; that is to say, the number of bytes. However, the L register also is used as a general purpose register and data may be stored therein for use in some logical or arithmetic operation.

An arithmetic and logical unit 699, FIG. 1*c*, is connected between an A register 130 and a B register 131 to receive data from said A and B register and perform some arithmetic or logical operation. The ALU contains circuitry disclosed in the aforementioned application for doing a true complement operation on a byte of data presented by the B register 131. It also has the facility to process either the high or the low portion of the byte contained in the B register. The output of the A register is presented to the ALU and on this side, provision is made for using the high or low portion of the byte within the A register. Further, this portion of the ALU contains circuitry for accepting the character STRAIGHT; that is to say, with the high order bits at the high order positions and the low order bits at the low order positions, or crossing the bits so that high four bits appear at the low four bits position and vice versa.

Carry controls are provided at the output of the ALU and operate to set the status latches in the S register 140 to affect the sequence of subsequent micro instruction words. Noting the chart above it can be seen that the S2 latch indicates that the data presented to the ALU is $\bar{0}$. In the event of a carry in the ALU a status latch S3 is set. The status latches S4 and S5 indicate respectively when set that the output of the high four bits is equal to 0 and the output of the low four bits is equal to 0. Status latch S0 is a True-Complement latch and can be set as a result of an operation in the ALU.

The R register 139, FIG. 1*c*, acts primarily as the buffer for the storage device 2204. Information is read out from the sense amplifiers 2206 and is transferred to the R register 139. From the R register, data is transferred through the A bus 100, the ALU and to any particularly designated registers previously mentioned. Data may also be transferred from the R register onto the B bus 100 and into the B register 131.

In any event, the first register to which data is transferred in the central processing unit is the R register 139. From the output of the R register information is transferred back into storage 2204 on the inhibit bus 2208.

In a typical operation of the CPU at the beginning of any new instruction read out the address in the IJ register 134, 135 is moved into the MN address register 137, 138 and on a subsequent cycle the address in storage 2204 is selected and the data read into R register 139. From the R register 139, data is read through the A bus 100, the ALU 699, onto the Z bus 103 and into the G register 133. During this time the address in the IJ register would have been incremented and another address selected in the storage and the byte of data transferred to the R register, and subsequently, perhaps, to the L register to indicate one of a number of conditions.

On succeeding IJ cycles, data will be transferred to the T register to indicate a general purpose register in storage which is to be selected and with which the contents of UV register 142, 143 will be added to indicate a particular address in storage.

On each instruction cycle the output of the ALU is sensed by means of the status register latches which in turn operate to help control the next address location in read-only storage from which the next successive micro instruction word will be selected. As discussed previously the G register 133 which contains a number of bit latches is also used to control the selection of the addresses of micro instruction words in the "read-only" storage. This decoding is specifically described and shown in the above-mentioned Amdahl et al. application.

The WX register 144, 145, shown in FIG. *1a*, selects the address in the "read-only" storage which will be read out to control the machine. Register HW and HX, 148, 149, CW and CX, 146, 147, are used in conjunction with the "read-only" storage and are described particularly in the above-mentioned case. The selector channel *5a* and *5b* shown in FIG. *1a* is an output from the central processing unit and will be described in more detail hereinafter. As it will be noticed there is an output 2257 from the storage 2204, a K bus 2274, an A bus 100, and the inhibit bus 2208, connected to the selector channel.

The present invention is directed to the protection of main storage in the central processing unit.

This feature prevents the invalid alteration of data in the main storage unit 2201 due to a program error or the like.

The storage protect circuits are illustrated in detail in FIGS. *3a* to *3c*.

The main storage device 2201 includes a main storage area 2204 for which protection is provided. A CPU Bump Storage area (not shown) and a UCW Bump Storage area (not shown) are not protected in the preferred embodiment.

Each program is assigned a 4-bit instruction key in its PSW (Program Status Word).

The main storage area 2204 is divided into 2,048 byte blocks, and each block has a 4-bit protection key associated with it. In effect, each block is assigned to a particular program, and only that program can alter data in the block. Exceptions to this program assignment are effected in the preferred embodiment by assigning the key 0000 to a PSW (Program Status Word) to render all of the blocks unprotected for that program or the assignment of the key 0000 to one or more blocks to permit their use with any and all programs.

A 4-bit storage key register means is provided for each block of storage and a 4-bit instruction key register means is assigned to the active PSW, that is the PSW of the program being run.

Two instructions augment this function:

(1) Set Storage Key

| OP | R1 | R2 |
|---|---|---|

which causes the key contained in the register R1 to be set in a key storage register means for the block of storage designated by the contents of register R2 and (2) Insert Storage Key

| OP | R1 | R2 |
|---|---|---|

which cause the key in the key storage register of the block of storage addressed by the contents of register R2 to be inserted into the register R1.

In the preferred embodiment, the storage key registers are in the form of a core storage device 902 which is addressed by way of the high order positions of the main storage address register. In the CPU mode of operation, the 4-bit key in an addressed storage key register is compared with the key of the active PSW to determine if data at that address may be validly altered.

The operation for a normal CPU storage access is as follows:

(1) A storage protect address register 915 is set upon the initiation of the CPU read signal; and, after a 125 nanosecond delay, a clock 911 in the key storage device 902 is started.

(2) The key selected from the storage device 902 is set into a low order section 905 of a QM register 903.

(3) The key in the low order section of the QM register is compared to the PSW key in the high order section 904 of the QM register.

(4) If a mismatch between the keys occur, and neither key is 0000, and the cycle is one which alters the data in the location accessed (by clearing the location or by inserting new data), the main storage controls are acted upon to force data just read from the main storage to be inserted into the main storage register R for regeneration into the same position from which it was removed. If a match occurs, or if either key is 0000, there is no change in the storage controls.

Each I/O (Input-Output) device on the multiplex channel is assigned an instruction key which indicates which block(s) of storage the device may utilize; and an additional key storage register is provided in the storage device 902 for the key of each I/O device.

The instruction key for each I/O device is stored in the key storage 902 in the address assigned to the I/O device when the UCW (Unit Control Word) is formed during a Start I/O operation. This key is initially contained in the 0–3 bits of the CAW (Channel Address Word). In the preferred embodiment, the UCW does not have a sufficient number of bit positions available for its memory protect instruction key; hence, the use of the key storage 902 for the I/O instruction keys.

When a Multiplex Share Cycle is initiated, the following operations occur:

(1) The active PSW key in the high order section of the QM register is stored in the CPU Bump area.

(2) When the UCW for the active I/O device is transferred from the UCW Bump area to hardware, the I/O instruction key for that UCW is read from the key storage 902 to the low order section of the QM register.

(3) The QM register is gated to the A bus, crisscrossed, and the I/O instruction key is inserted into the high order section of the QM register.

(4) During the succeeding data cycle the storage protect key for the addressed block of main storage is read from the key storage device 902 into the low order section of the QM register, matched against the I/O instruction key in the high order section of the QM register to determine the existence of a match or mismatch condition. In the event of a mismatch, and neither key being 0000, the data read from the main storage is regenerated into the same address from which it was removed as described above with respect to the normal CPU mode of operation.

(5) When the UCW is restored to the UCW Bump area, the I/O instruction key in the high order position of the QM register is gated to the A bus, criss-crossed and inserted into the low order section of the QM register by way of the ALU and the Z bus for regeneration into the location in the key storage device 902 for the particular UCW; and the storage protect key for the active PSW is recalled from the CPU Bump storage area and set into the high order section of the QM register.

(6) The CPU operation continues.

Memory protection may be provided for the Select Channel mode of operation. Since the method and means may be similar to that described with respect to the CPU and Multiplex Channel mode of operation, no description of memory protection for the Select Channel mode will be described.

The storage protect circuits of FIGS. 3*a* to 3*c* include an auxiliary storage device 902 for the storage keys assigned to the protected areas of main storage and for the I/O instruction keys. A QM register 903 includes a high-order section 904 for receiving the instruction key of the active CPU program or I/O device, and a low-order section 905 for receiving from the device 902 the storage key of each addressed block of main storage locations. A compare circuit 906 analyzes the instruction and storage keys to assure protection of the main storage areas.

The storage device 902 in the preferred embodiment is a relatively low capacity core storage device of any conventional type having storage controls 910 and a single cycle clock 911. The timing for the device 902 is shown in FIG. 2. The storage device 902 must be operated at a speed which is twice the speed of the main storage unit 2201. In the event that the main storage unit is constructed of core materials and drive circuits which provide the highest possible speed for core storage devices, the storage device 902 will be constructed in a conventional manner of electronic registers.

The storage device 902 is addressed by means of either the five high-order bits M0–M4 of the M address register 197 of main storage during the CPU mode of operation or alternatively by the five high-order bits N0–N4 of the N address register 138 of main storage during a MULTIPLEX CHANNEL mode of operation. The selected outputs of the M and N address registers are connected to the inputs of a memory protect address register 915. Each bit section 916–1 to 916–6 of the register 915 includes a pair of AND circuits such as 917–1 and 917–2, the outputs of which are connected to an OR INVERT circuit such as 918, the output of which in turn is connected to a flip-flop latch such as 919. Each of the AND circuits has one of its inputs connected to a respective main memory address register output. Thus, the AND circuit 917–1 has its input connected to the M–4 output line and the AND circuit 917–2 has its input connected to the N–4 output line.

The bit existing on the M–4 line is gated into the latch 919 during a CPU main memory access cycle by means of a pulse on the main memory CP line 428*a*. The data bit on the N–4 line is entered into the latch 919 during a MULTIPLEX SHARE CYCLE by means of a UCW Bump CP pulse on the line 427. The gate signal to the latch 919 is provided by coincident input pulses to an AND circuit 920 on lines Give Read and A Time 159. The A Time pulse originates at the output of the main memory clock.

The storage area of the device 902 is divided into two sections. Section 921 provides thirty-two 4-bit word positions for the storage keys, and section 922 provides thirty-two 4-bit word positions for the I/O instruction keys.

The thirty-two positions in section 921 accommodate 32 blocks of main storage locations. If each block includes 2,048 locations a 64K main storage can be handled. Each I/O device is assigned an address for its eight bytes of storage in the UCW Bump Storage area. Thus the 256 positions in the UCW Bump area in main storage provide storage for 32 I/O units, each of which has a 4-bit word position in the section 922 for its key.

Since there are 64 word positions provided in the storage device 902, six sections must be provided in the address register 915. Therefore, the upper position 916–1 of the register 915 is provided for selecting the desired storage areas 921 or 922. The input 925 of sections 916–1 is connected to ground potential. When a main memory CP signal is applied to the line 428*a*, a logic zero is set in the latch of the section 916–1 representative of the PSW key storage area 921.

The other logic input of the section 916–1 is the MPLX LATCH line 2303. This line is positive during multiplex routines and sets a logic one in the register section 916–1 representative of the UCW key and storage area 922.

The outputs of the address register 915 are connected to the storage controls 910 by way of a conventional decode circuit 926.

The clock 911 of the memory protect storage is energized to provide one read or one write cycle by way of a pair of AND circuits 927 and 928, the outputs of which are applied to a negative OR INVERT circuit 929, which is connected to the clock 911 by way of a 125 nanosecond time delay circuit 930 and an inverter 931. The AND circuit 927 is operated to start a clock pulse during a read cycle upon the coincidence of a Give Read signal and the A Time signal on the line 159. The AND circuit 928 is operated to start the clock 911 during a write cycle upon the coincidence of a Give Write signal and the A Time signal on the line 159.

The AND circuits 927 and 928 also selectively operate a Read-Write latch 932, which is connected to the storage controls 910. The latch circuit 932 includes a pair of positive AND INVERT circuits 933 and 934. When the AND circuit function 927 is satisfied, the latch output goes relatively positive for selection of the read circuits in the controls 910; and when the function of the AND circuit 928 is satisfied, the output of the latch goes relatively negative to select the write circuits of the controls 910.

The high-order section 904 of the QM register includes four latches 940–0 to 940–3, and the low-order section 905 of the register includes four latches 940–4 to 940–7. The $\overline{Z0}$ to $\overline{Z3}$ of the negative Z bus provides the data input to the high-order latches 940–0 to 940–3. The $\overline{Z4}$ to $\overline{Z7}$ lines of the negative Z bus provide data inputs to the low-order latches 940–4 to 940–7 by way of the positive AND circuits 942–1 to 942–4 and OR INVERT circuits 943–1 to 943–4.

Alternatively, the output lines 944–1 to 944–4 of the memory protect key storage device 902 are controlled to enter the protect keys into the low-order latches 940–4 to 940–7 by way of positive AND circuits 945–1 to 945–4 and the OR INVERT circuits 943–1 to 943–4.

Data from the $\overline{Z4}$ to $\overline{Z7}$ lines are applied to the inputs of the low-order QM register latches when a positive signal is received on the line 2343 and applied to the AND circuits 942–1 to 942–4. The line 2343 goes positive when the QM register is the destination for data on the Z bus (i.e. $QM$=Z.). This same signal on the line 2343 is also utilized to enter the data bits on the $\overline{Z0}$ to $\overline{Z3}$ lines into the high-order latches of the QM register.

More particularly, the line 2343 is connected to one input of an AND circuit 946, the other input of which is the D time output line 162 of the main memory clock. Coincidence of the D time signal with the $QM$=Z signal produces a negative signal on line 2343 at the output of the AND circuit 946 to cause an inverter 947 to produce a positive pulse at its output line 948. The line 948 is connected to the gate inputs of the QM register latches 940–0 to 940–3.

The line 2343 is also applied to the inputs of the AND circuits 945–1 to 945–4 by way of an inverter 949. Thus, when the line 2343 is in the down or relatively negative condition, the output of the inverter 949 is relatively positive to enter storage key into the low-order latches 940–4 to 940–7, by way of the AND circuits 945–1 to 945–4 and the negative OR INVERT circuits 943–1 to 943–4.

Thus, it can be seen that the condition of the line 2343 determines whether the Z bus data or, alternatively, key data from the memory protect storage are entered into the low-order latches of the QM register.

The line 2343 is also applied to one input of an AND circuit 950, the other input of which is the D time output line 162 of the main memory clock. Coincidence of positive pulses on the line 2343 and the line 162 applies a gate signal to the low-order latches 940–4 to 940–7 by way of an AND circuit 950, an OR INVERT circuit 951, an invert circuit 952, and gate line 953. This gate pulse controls the entry of data into the low-order latches from the Z bus.

A Strobe Out pulse on the line 954 derived from the clock 911 of the memory protect key storage applies a gate pulse into inputs of the low-order latches of the QM register by way of the OR INVERT circuit 951, the inverter 952 and the line 953 to enter keys into the low-order latches of the QM register from the memory protect key storage device 902.

The outputs of the high-order latches 940–0 to 940–3 of the QM register are connected to inputs of the gate circuit **563*a*, the output of which is connected to the A bus. The outputs of the low-order latches of the QM register are applied to inputs of the gate circuit by way of inverters 955–1 to 955–4**.

In this regard, it will be noted that the latches 940–0 to 940–7 provide an invert function between their inputs and outputs. Since the complement signals $\overline{Z0}$ to $\overline{Z3}$ were entered into the high-order register latches, the true values of the instruction key appear at the latch outputs, Q0–Q3, respectively.

However, the outputs $\overline{Q4}$–$\overline{Q7}$ of the low-order latches are the complement values of the storage protect key from either the $\overline{Z4}$–$\overline{Z7}$ lines or the protect storage output lines 944–1 to 944–4. An additional stage of inversion (OR INVERT circuits 943–1 to 943–4) occurs between the $\overline{Z4}$–$\overline{Z7}$ input lines and the low-order latches. The complement values of the output lines of the storage 902 are inverted in the negative OR INVERT circuits 943–1 to 943–4 and again in the low-order latches, thereby providing the complement values at the outputs $\overline{Q4}$ to $\overline{Q7}$ of the low-order latches.

The output Q4 to Q7 of the inverters 955–1 to 955–4 provide the true values of the storage keys.

The data in the QM register is gated to the A bus during each Multiplex Share Routine in order to store the contents (PSW key) of the QM register in the CPU Bump storage area. Data is also gated from the QM register into the A bus during Multiplex Share Request, subsequent to insertion of the protect key code from the UCW to the low-order section of the QM register code to transfer the protect key from the low-order section to the high-order section of the QM register by way of the A bus, a selected A register, the ALU, and the Z bus by means of the criss-cross mode of operation in the A register described above.

When the UCW is restored into the bump storage area of main memory, the protect key in the high-order section of the QM register is criss-crossed through the ALU to the low-order section of the QM register, the gate circuit, the A bus, the ALU, and the Z bus. The UCW key in the low-order bus of the QM register is then restored into the memory protect key storage device 902.

The gate circuit **563*a*** for transferring data to the A bus (*A=QM*) is activated by a positive pulse applied to the gate input line 563.

The TRUE outputs Q0 to Q3 and the COMPLEMENT outputs $\overline{Q4}$ to $\overline{Q7}$ of the QM register are applied to the compare circuit 906. The compare circuit 906 includes a plurality of exclusive OR circuits 960–1 to 960–4. The TRUE outputs Q0 to Q3 are connected to respective inputs of the exclusive OR circuits by way of inverters 961–1 to 961–4. The COMPLEMENT outputs $\overline{Q4}$ to $\overline{Q7}$ are connected directly to the other inputs of the exclusive OR circuits.

The outputs of the exclusive OR circuits are connected to respective inverters 962–1 to 962–4, the outputs of which are OR'ed together. The outputs $\overline{Q0}$ to $\overline{Q3}$ of the inverters 961–1 to 961–4 are the COMPLEMENT values.

Only when the logic values of the input circuits to an exclusive OR circuit differ is an output pulse produced. A positive-going output pulse from an exclusive OR circuit produces a negative-going pulse at the output of its respective inverter 962–1 to 962–4. Since the outputs of these inverters are OR'ed, a negative-going output pulse from any one of the inverters will indicate a mismatch condition. When a match condition exists, with respect to all positions of the high and low order latches of the QM register, no pulse is produced at the outputs of the inverters 962–1 to 962–4.

The low order outputs $\overline{Q4}$ to $\overline{Q7}$ are connected to the inputs of an AND circuit 963. Positive potential levels on all of the outputs $\overline{Q4}$ to $\overline{Q7}$, i.e. key code 0000, produce a negative-going pulse at the output of AND circuit 963. This negative-going pulse produces a positive-going pulse at the output line 964 of a negative OR invert circuit 965. A key other than 0000 in the lower order latches of the QM register produces a positive signal level at the output of the AND circuit 963.

The outputs $\overline{Q0}$ to $\overline{Q3}$ of the inverters 961–1 to 961–4 are connected to the input of an AND invert circuit 966, the output of which is connected to a second input of the negative OR invert circuit 965. The presence of the key 0000 in the high order latches of the QM register will produce positive levels on the outputs $\overline{Q0}$ to $\overline{Q3}$ to produce a negative signal at the output of the AND invert circuit 966 and a positive signal at the output of negative OR invert circuit 965. Any other key will produce a positive signal at the output of the AND invert circuit 966.

Positive levels at the outputs of both AND invert circuits 963 and 966 produce a negative signal at the output of the OR invert circuit 965.

The output of the negative OR invert circuit 965 is applied to one input of a negative AND invert circuit 970. The OR'ed output 967 of the inverters 962–1 to 962–4 is applied to a second input of the circuit 970. The MEMORY CP line **428*a* is applied to a third input of the circuit 970 by way of an inverter 971. The MEMORY CP line is UP when an area of main memory other than the bump area is being addressed. It will be recalled that memory protection is not provided for the bump area of main memory and, therefore, when the bump area is being addressed, the memory CP line is DOWN providing a positive input to the circuit 970**.

In the event that the main storage area 2204 is addressed, a mismatch condition occurs and neither the high nor the low latches of the QM register has the key code 0000, the Protect Location line 975 of the circuit 970 goes relatively positive. In the event that a match condition occurs, or either the high or low order latches of the QM register has the key 0000, or the bump area of main memory is being addressed, the line 975 will be relatively negative.

The Protect Location line 975 is applied to one input of an AND invert circuit 976, to one input of an AND invert circuit 977 and to the input of an invert circuit 978.

It will be recalled that the memory protect feature is required only when the contents of a protected area in main memory storage are being altered or cleared. When the contents of a protected area of main storage are to be changed, the CPR Z DEST. (8) line **290*a* goes positive, i.e. data on the Z bus is to be set in the main memory register R, i.e., $R=Z$. The line 290***a* is connected to second inputs of the AND invert circuits 976 and 977. With both inputs of the AND invert circuit 976 relatively positive, a negative pulse is produced at the memory PROTECT output line 979. The line 979 provides a third OR'ed input to the inverter which controls a STORAGE to R line 429.

The line 429 is positive during a normal read operation to cause the data from a position in main memory storage to be gated into the memory register R. This line will be relatively negative during a read cycle when the memory contents are to be altered (e.g. $R=Z$ dest.) or cleared. However, during an $R=Z$ destination program step where a memory PROTECT signal is applied to the line 979, this signal will drive the line 429 positive, while the data being read out of the main storage is still available and force the data into the R register for regeneration into the location from which it was removed during the succeeding write cycle.

Also, the line 290 gates data from the Z bus into the main memory register R during an $R=Z$ destination program step. The gate line 290 is the output of a positive AND circuit 980, one input of which is the CPR Z DEST. (8) line 290*a*. The other input of the AND circuit 980 is the output of the inverter 978. It will be recalled from the description immediately above that the output of the invert circuit 978 is relatively negative, in the event that the protection of the memory position is to be effected as a result of a mismatch between the instruction and storage keys. Thus, when a mismatch condition occurs, the output of the inverter 978 prevents the positive pulse from the conductor 290*a* from being extended to the gate line 290, thereby preventing gating of the data from the Z bus to the R register and thereby preventing an alteration of the data in the main memory position addressed.

The AND invert circuit 977 includes a third input from the MAIN MEMORY READ STROBE line. With the three inputs positive, a negative signal is applied to the output $\overline{\text{CPU}}$ MM PROTECT request line 982. The output of the AND invert circuit 977 is also connected to an inverter 983, the output of which is the CPU MM PROTECT REQUEST line 984 which goes positive and the output of the AND invert circuit 977 goes negative.

The lines 982 and 984 control priority circuits (not shown) to initiate a desired interrupt routine.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a data processing system of the type having storage means comprising a plurality of addressable locations within which instruction manifestations and other data manifestations may be stored, each location being accessible in response to address manifestations, control manifestations, and timing manifestations, said address, control and timing manifestations defined at least in part by selected ones of said instruction manifestations and characteristics of said system, said instruction manifestations including operational and address portions, said addressable locations being accessible for storing and fetching manifestations, a storage protection control apparatus, comprising a plurality of storage key means, each corresponding to an identifiable one of a plurality of groups of said addressable storage locations, each one capable of storing a selected one of a plurality of coded manifestations, including a particular code configuration to indicate that any one of said groups identified thereby is unprotected, instruction key means for storing a selected one of said plurality of coded manifestations, said instruction key means capable of storing said particular code configuration to indicate that none of said groups are protected, and protection means responsive to said instruction key means and to a selected one of said storage key means for comparing the manifestations stored therein with one another, and for generating a unique alarm manifestation in the event that either of them specifies a manifestation having a code configuration other than said particular code configuration which is not equal to the code configuration of the other one.

2. The device described in claim 1, wherein said storage key means additionally comprises, means responsive to an address portion for selecting the one of said plurality of coded manifestations corresponding to the one of said groups within which the addressable location related to said address portion is situated.

3. The device described in claim 1 wherein there is also provided, within different groups of said locations, different sets of coded instruction manifestations respectively corresponding to different programs which said system is capable of performing, and wherein there is provided a coded manifestation having a known code configuration for each of said sets.

4. The device described in claim 1 wherein said system also comprises, selectively operable input/output control means for handling the transfer of data between selected input/output devices and said storage means, said input/output control means including a control key means for presenting coded manifestations having code configurations indicative of various ones of said groups with which data transfer may be effected by said control means, and means responsive to control and timing manifestations of said system for causing said protection means to selectively respond to said control key means or to said instruction key means, alternatively, in dependence upon said input/output control means effecting transfer with said storage means, or not respectively.

5. In a data processing system of the type having a main storage device comprising a plurality of addressable locations arranged in blocks and storing instruction and data manifestations and a central processing unit cooperating with said manifestations for carrying out the programs indicated by said instruction manifestations, storage protection apparatus comprising, a storage means for each block of locations and having stored therein a selected storage key assigned to a particular program, storage means for storing instruction keys assigned to the respective programs including a particular instruction key rendering all of the addressable locations accessible to the respective program, means for inserting into the latter storage means, the active instruction key of the program currently being run by the central processing unit, means effective, each time said main storage device is addressed, for comparing the active instruction key with the storage key of the location addressed, and means controlled by the comparing means for preventing the alteration of data in the addressed location when the active instruction key, other than said particular instruction key, does not bear a predetermined relationship to the storage key.

6. In a data processing system of the type having a main storage device comprising a plurality of addressable locations arranged in blocks and storing instruction and data manifestations and a central processing unit cooperating with said manifestations for carrying out the programs indicated by said instruction manifestations, storage protection apparatus comprising, a storage means for each block of locations and having stored therein a selected storage key assigned to a particular program, or alternatively, a particular storage key rendering the respective block of locations accessible by all programs, storage means for storing instruction keys assigned to the respective programs including a particular instruction key rendering all addressable locations accessible to the respective program, means for inserting into the latter storage means, the active instruction key of the program currently being run by the central processing unit, means effective, each time said main storage device is addressed, for comparing the active instruction key with the storage key of the location addressed, and means controlled by the comparing means for preventing the alteration of data in the addressed location when the storage key of the addressed location, other than said particular storage key, does not bear a predetermined relationship to the active instruction key, other than said particular instruction key.

7. In a data processing system of the type having a main storage device comprising a plurality of addessable locations arranged in blocks and storing instruction and data manifestations, a central processing unit cooperating with the manifestations for carrying out programs indicated by said instruction manifestations, a plurality of input/output devices and means cooperating with the central processing unit for controlling the transfer of data manfestations between addressed locations of the main storage device and the input/output device, storage protect apparatus comprising, a memory protect key storage device including a plurality of storage means each for receiving an instruction key assigned to a respective input/output device, including a particular instruction key rendering all blocks of locations accessible to the respective input/output devices, said memory protect key storage device including a second plurality of storage means each having stored therein a storage key assigning a respective block of locations to a particular program and/or to a particular input/output device, or alternatively, a particular storage key rendering the respective block of locations accessible by all programs and all input/output devices, a storage key register, an instruction key register, means effective, each time data transfer between an addressed location in the main storage device and a predetermined input/output device is initiated, for transferring the storage key corresponding to the addressed location to the storage key register and the instruction key corresponding to the predetermined input/output device to the instruction key register, means for comparing the keys in the registers, and means controlled by the comparing means preventing the alteration of data in the addressed location when both keys are other than the particular keys and do not bear a predetermined relationship with each other.

8. In a data processing system of the type having a main storage device comprising a plurality of addressable locations arranged in blocks and storing instruction and data manifestations and a central processing unit cooperating with said manifestations for carrying out the programs indicated by said instruction manifestations, storage protection apparatus comprising, a storage means for each block of locations having stored therein one of a predetermined plurality of keys, selected ones of said keys being assigned to respective programs, and a particular one of said assigned keys indicating that all blocks of locations are accessible to a program to which the particular key is assigned, additional storage means, means for inserting into the additional storage means, an active key corresponding to the program currently being run by the central processing unit, and means effective each time said main storage device is addressed for initiating a protection signal in the event that the active key of the current program, other than said particular key, does not bear a predetermined relationship to the key of the location addressed.

9. In a data processing system of the type having a main storage device comprising a plurality of addressable locations arranged in blocks and storing instruction and data manifestations, a central processing unit cooperating with the manifestations for carrying out programs indicated by said instruction manifestations, a plurality of input/output devices and means cooperating with the central processing unit for controlling the transfer of data manifestations between addressed locations of the main storage device and the input/output device, storage protect apparatus comprising, a storage means for each block of locations having stored therein one of a predetermined plurality of keys, selected ones of said keys being assigned to respective input/output devices, and a particular one of said assigned keys indicating that all blocks of locations are accessible to an input/output device to which the particular key is assigned, additional storage means, means for inserting into the additional storage means, an active key corresponding to an input/output device currently initiating the transfer of data manifestations with the main storage device, and means effective each time the transfer of data manifestations between an input/output device and the main storage device is initiated for producing a protection signal in the event that the active key of the current program, other than said particular key, does not bear a predetermined relationship to the key of the location addressed.

References Cited

UNITED STATES PATENTS

| | | | |
|---|---|---|---|
| 3,108,257 | 10/1963 | Buchholz | 340—172.5 |
| 3,153,775 | 10/1964 | Marsh | 340—172.5 |
| 3,264,615 | 8/1966 | Case et al. | 340—172.5 |

ROBERT C. BAILEY, *Primary Examiner.*

O. E. TODD, *Assistant Examiner.*